United States Patent [19]
McMenim

[11] 3,873,560
[45] Mar. 25, 1975

[54] MANUFACTURE OF TETRAMISOLE

[75] Inventor: Michael Edward McMenim, Macclesfield, England

[73] Assignee: Imperial Chemical Industries Limited, London, England

[22] Filed: May 3, 1973

[21] Appl. No.: 356,810

[30]  Foreign Application Priority Data
May 23, 1972  United Kingdom........... 24197/72

[52] U.S. Cl..................... 260/306.7 T, 260/306.7 R
[51] Int. Cl........................................... C07d 99/10
[58] Field of Search .............. 260/306.7 T, 306.7 R

[56]  References Cited
UNITED STATES PATENTS
3,726,894  4/1973  Spicer.............................. 260/306.7

Primary Examiner—Richard J. Gallagher
Attorney, Agent, or Firm—Cushman, Darby & Cushman

[57]  ABSTRACT

Process for the manufacture of known anthelmintic tetramisole by reacting 3-(2-amino-2-phenylethyl)-thiazolidin-2-thione derivative with alkylating or like agent, for example benzyl chloride. Starting materials obtained by reacting N-(2-acrylamino-2-phenylethyl)ethanolamine derivative with carbon disulphide.

6 Claims, No Drawings

MANUFACTURE OF TETRAMISOLE

Tetramisole, i.e. dl-2,3,5,6-tetrahydro-6-phenylimidazo[2,1-b]thiazole, and its pharmaceutically-acceptable acid-addition salts, and the corresponding laevorotatory compounds, are well known to be useful as anthelmintic agents. This invention relates to a new process for the manufacture of tetramisole and acid-addition salts thereof, to intermediates used in said process, which are new compounds, and to a process for the latters' manufacture.

According to the invention there is provided a process for the manufacture of tetramisole and pharmaceutically-acceptable acid-addition salts thereof, which comprises reacting a compound of the formula:-

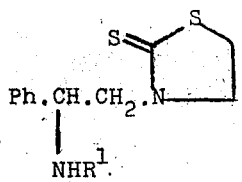

wherein Ph stands for a phenyl radical ($C_6H_5-$) and $R^1$ stands for hydrogen or a group of the formula $-COR^2$, wherein $R^2$ stands for hydrogen, an alkyl radical of not more than 5 carbon atoms, a phenyl radical, or a phenylalkyl radical of not more than 10 carbon atoms, with an alkylating agent which is either triethyloxonium fluoroborate or a compound of the formula $R^3X$, wherein $R^3$ stands for an alkyl radical of not more than 12 carbon atoms, an alkenyl radical of not more than 5 carbon atoms (excluding a vinyl radical), or a phenylalkyl radical of not more than 10 carbon atoms, and X stands for a halogen atom or a group of the formula $-O.SO_2.R^4$ or $-O.SO_2.OR^5$, wherein $R^4$ stands for an alkyl radical of not more than 5 carbon atoms, or a phenyl or tolyl radical, and $R^5$ stands for an alkyl radical of not more than 5 carbon atoms, and, when the reactant $R^3X$ has the formula $R^3O.SO_2.OR^5$, then $R^3$ and $R^5$ stand for the same alkyl radical of not more than 5 carbon atoms.

A suitable value for $R^2$ is, for example, hydrogen or a methyl, butyl, phenyl or benzyl radical. A suitable value for $R^3$ is, for example, a methyl, ethyl, octyl, decyl, allyl, 2-methylallyl or benzyl radical. A suitable value for X when it stands for a halogen atom is a chlorine, bromine or iodine atom. A suitable value for $R^4$ is, for example, a methyl, phenyl or p-tolyl radical. A suitable value for $R^5$ is, for example, a methyl or ethyl radical.

The above-mentioned process may be carried out in the absence or presence of a solvent. Suitable solvents are dimethylformamide, nitrobenzene, acetone, methyl isobutyl ketone, tetrachloroethylene, diethyleneglycol diethyl ether, n-butyl acetate, methylene dichloride and formic acid. It is to be understood that the process must be carried out under non-aqueous conditions up to the stage where the intermediate of the formula II (see below) is formed. However, the subsequent stage resulting in the formation of tetramisole can be carried out under non-aqueous conditions, for example using an organic solvent mentioned above, or aqueous conditions, for example using aqueous acetone. The process as a whole is conveniently carried out at a temperature of 20° to 200°C., depending upon the alkylating agent and solvent (if any) used.

It is to be understood that the above-mentioned process proceeds via an intermediate compound of the formula:

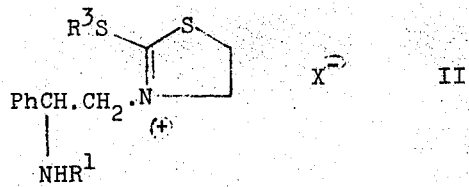

wherein Ph, $R^1$ and $R^3$ have the meanings stated above, and $X^-$ stands for an ion corresponding to X, the latter having the meaning stated above, or via an equivalent intermediate compound in which $X^-$ stands for a fluoroborate ion, for example 2-ethylthio-3-(2-phenylacetylamino-2-phenylethyl)-4,5-dihydrothiazolium fluoroborate, in the case where the alkylating agent is triethyloxonium fluoroborate.

According to a further feature of the invention there is provided a process for the manufacture of tetramisole and pharmaceutically-acceptable acid-addition salts thereof, which comprises either heating a compound of the formula II at 50° to 200°C., optionally in an organic solvent, or adjusting an aqueous or non-aqueous solution of a compound of the formula II to pH 4 to 14, and wherein Ph, $R^1$ and $R^3$ have the meanings stated above, and $X^-$ stands for the fluoroborate ion or for an anion corresponding to X, the latter having the meaning stated above.

Suitable organic solvents are those mentioned above. A preferred temperature at which the said compound of the formula II may be heated is 180°C. In the alternative method for carrying out this process, a preferred pH is about 9.5.

The said intermediate compound of the formula II, wherein Ph, $R^1$, $R^3$ and $X^-$ have the meanings stated above, may be obtained as described in Example 25 herein, or by a similar process using equivalent reactants and solvent.

According to a further feature of the invention there are provided compounds of the formula I, wherein Ph and $R^1$ have the meanings stated above.

Specific compounds of the formula I are, for example, 3-(2-amino-2-phenylethyl)thiazolidin-2-thione, 3-(2-formylamino-2-phenylethyl)thiazolidin-2-thione, 3-(2-acetylamino-2-phenylethyl)thiazolidin-2-thione, 3-(2-phenylacetylamino-2-phenylethyl)thiazolidin-2-thione, 3-(2-benzoylamino-2-phenylethyl)thiazolidin-2-thione and 3-(2-valerylamino-2-phenylethyl)thiazolidin-2-thione.

According to a further feature of the invention there is provided a process for the manufacture of those of the compounds of the formula I wherein Ph has the meaning stated above and $R^1$ stands for a group of the formula $-COR^2$, wherein $R^3$ has the meaning stated above, which comprises reacting a compound of the formula:-

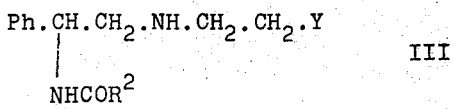

wherein Ph and $R^2$ have the meanings stated above and Y stands for a hydrogen-sulphato radical ($-OSO_3H$) or a chlorine or bromine atom, with carbon disulphide at a pH greater than 4.

The reaction is preferably carried out at pH 8 to 10. This pH may be obtained by the addition of a basic substance, for example a strong or relatively weak inorganic base, for example an alkali metal hydroxide or carbonate, for example sodium hydroxide or potassium carbonate, or a strong organic base, for example a dialkylamine of not more than 10 carbon atoms, for example diethylamine, or a trialkylamine of not more than 15 carbon atoms, for example triethylamine. The reaction is conveniently carried out in a solvent, for example water, or an alkanol of not more than 5 carbon atoms, for example methanol, ethanol or butanol, or a dipolar aprotic solvent, for example dimethylformamide, or a mixture of any of these. The reaction may be carried out at a temperature between 0°C. and reflux temperature, but it is conveniently carried out at room temperature. The carbon disulphide which is one of the reactants may, if desired, be generated in situ, for example from a dialkylammonium N,N-dialkyldithiocarbamate, for example diethylammonium N,N-diethyldithiocarbamate, or an alkali metal alkyl xanthate, for example potassium ethyl xanthate. It is to be noted a dialkylamine, which can be used as the basic substance (see above), is generated by the use of a dialkylammonium N,N-dialkyldithiocarbamate.

The starting materials of the formula III may be obtained, as described in our co-pending United Kingdom patent application No. 35206/71, by reacting a compound of the formula:

$$Ph.CHOH.CH_2.NH.CH_2.CH_2Z$$

IV wherein Ph has the meaning stated above and Z stands for a hydroxy radical or a chlorine or bromine atom, with a compound of the formula $R^2CN$, wherein $R^2$ has the meaning stated above, in the presence of concentrated sulphuric acid at −20° to 60°C., and preferably at −10° to 20°C. In the case where $R^2$ stands for hydrogen there may be used a corresponding inorganic cyanide, for example an alkali metal cyanide, for example sodium cyanide.

The compound of the formula I wherein Ph has the meaning stated above and $R^1$ stands for hydrogen may be obtained by hydrolysing a compound of the formula I wherein $R^1$ stands for a group of the formula $-COR^2$, wherein $R^2$ has the meaning stated above, for example a benzyl radical, by means of an inorganic acid, for example hydrochloric acid.

The invention is illustrated but not limited by the following Examples:

EXAMPLE 1

N-(2-Acetylamino-2-phenylethyl)ethanolamine-O-sulphate (9.06g.) was dissolved in a mixture of water (6ml.) and ethanol (12ml.), and a solution of sodium hydroxide (2.8g.) in water (7.5ml.) was added. Carbon disulphide (3ml.) was added, and the solution was refluxed for 30 minutes. Water (15ml.) was added and the reaction mixture allowed to stand overnight at room temperature. The product was filtered off, washed with water (50ml.) and dried at 70°C., giving 3-(2-acetylamino-2-phenylethyl)thiazolidin-2-thione which, after crystallization from a 1/1 v/v 1/1 of chloroform and ethanol, had m.p. 181°-184°C.

The sulphate used as starting material was obtained as follows:

Sulphuric acid (98% w/w; 80g.) was added to acetonitrile (12.3g.) with stirring below 50°C. The solution was cooled to −10°C., and N-(2-hydroxy-2-phenylethyl)ethanolamine (18.1g.) was added in portions over 15 minutes, maintaining the temperature below 0°C. The reaction mixture was stirred at 0°C. for 1 hour and then at 25°C. for 2 hours. The mixture was then poured onto ice (200g.) and the resulting mixture adjusted to pH 5 with 18N-sodium hydroxide, adding ice to keep the temperature below 10°C. The solution was evaporated to dryness at 50°C./15mm. The residue was extracted with ethanol (500ml.), and the extract was filtered and the filtrate evaporated at 50°C. in vacuo to dryness. The residue was dissolved in boiling ethanol (100ml.), and the solution allowed to cool to room temperature. The resultant crystals were filtered off, washed once with ethanol (20ml.), and dried at 70° C. to give N-(2-acetylamino-2-phenylethyl)ethanolamine-O-sulphate, m.p. 210°-212°C.

EXAMPLE 2

A mixture of 3-(2-acetylamino-2-phenylethyl)-thiazolidin-2-thione (2.8g.) and benzyl chloride (2ml.) was heated at 160°C. for 30 minutes. The reaction mixture was then poured into ethylene dichloride (25ml.) and the precipitated tetramisole hydrochloride was filtered off, washed with ethylene dichloride (5ml.) and dried at 50°C. After crystallisation from ethanol, a sample had m.p. 258°-260°C.

EXAMPLE 3

N-(2-Phenylacetylamino-2-phenylethyl)ethanolamine-O-sulphate (18.9g.) was dissolved in a mixture of water (10ml.) and ethanol (20ml.), and a solution of sodium hydroxide (4.7g.) in water (12.5ml.) was added. Carbon disulphide (5ml.) was then added, followed by water (75ml.). The reaction mixture was then kept overnight at room temperture. The mixture was filtered, and the solid residue washed with water (50ml.), and dried at 50°C. There was thus obtained 3-(2-phenylacetylamino-2-phenylethyl)thiazolidin-2-thione. After crystallisation from toluene, a sample had m.p. 184°-185°C.

The sulphate used as starting material was obtained as follows:

Sulphuric acid (98% w/v; 80g.) was added to stirred benzyl cyanide (39g.) at a temperature below 5°C. The solution was cooled to −10°C., and N-(2-hydroxy-2-phenylethyl)ethanolamine (18.1g.) was added in portions over 15 minutes, maintaining the temperature below 0°C. The reaction mixture was stirred at 0°C. for 1 hour, and then at 25°C. for 2 hours. The mixture was poured onto a stirred mixture of ice (200g.) and ethyl acetate (200ml.). The resulting white precipitate was filtered off, washed successively with ethyl acetate (200ml.) and water (200ml.), and then crystallised from water to give N-(2-phenylacetylamino-2-phenylethyl)ethanolamine-O-sulphate, m.p. 228°-229°C.

EXAMPLE 4

A mixture of 3-(2-phenylacetylamino-2-phenylethyl)-thiazolidin-2-thione (7.12g.) and benzyl chloride (3.8ml.) was heated at 150°C. for 30 minutes. The reaction mixture was cooled and poured into ethylene dichloride (25ml.), and the precipitated tetramisole hydrochloride was filtered off, washed with ethylene dichloride (5ml.) and dried at 70°C. After crystallisation from ethanol a sample had m.p. 258°–260°C.

EXAMPLE 5

A mixture of 3-(2-phenylacetylamino-2-phenylethyl)-thiazolidin-2-thione (7.12g.) and dimethyl sulphate (3ml.) was heated at 150°C. for 30 minutes. The reaction mixture, was cooled to room temperature and triturated with a mixture of ethylene dichloride (20ml.) and water (20ml.). The resulting mixture was filtered to remove a small amount of insoluble material. The filtrate was then separated and the aqueous phase was basified with sodium hydroxide solution (100°TW) to pH 12. The mixture was filtered, and the solid residue was washed with water (20ml.) and dried at room temperature. This material was dissolved in acetone (20ml.), the solution acidified to pH 2 with hydrochloric acid (36°TW), and the precipitated tetramisole hydrochloride was filtered off, washed with acetone (10ml.) and dried at 70°C. The product had m.p. 256°–259°C.

EXAMPLE 6

N-(2-Benzoylamino-2-phenylethyl)ethanolamine-O-sulphate (7.28g.) was dissolved in a mixture of 2N-sodium hydroxide (22.5ml.) and ethanol (10ml.). Carbon disulphide (2ml.) was added with vigorous stirring, the reaction mixture was allowed to stand for 1 hour, and water (60ml.) was then added. The mixture was filtered, and the solid residue washed with water (50ml.) and dried at 50°C. There was thus obtained 2-(2-benzoylamino-2-phenylethyl)thiazolidin-2-thione. After crystallisation from a 1/1 v/v mixture of toluene and ethanol, a sample had m.p. 222°–223°C.

The sulphate used as starting material may be obtained in analogous manner to that described in Example 3, but using an equivalent amount of phenyl cyanide in place of the benzyl cyanide. Said sulphate has m.p. 236°–239°C.

EXAMPLE 7

A mixture of 3-(2-benzoylamino-2-phenylethyl)-thiazolidin-2-thione (3.42g.) and benzyl chloride (1.3ml.) was heated at 180°C. for 20 minutes. The reaction mixture was cooled and poured into ethylene dichloride (15ml.). The mixture was filtered, the solid residue washed successively with ethylene dichloride (5ml.) and ether (5ml.), and dried, giving tetramisole hydrochloride, m.p. 255°–258°C.

EXAMPLE 8

N-(2-Acetylamino-2-phenylethyl)ethanolamine-O-sulphate (3.02g.) was dissolved in water (10ml.), and a solution of diethylammonium N,N-diethyldithiocarbamate (2.5g.) in water (5ml.) was added. The resulting solution, having a pH of approximately 5, was kept at room temperature for three days, and the precipitated produce was then filtered off, washed with water (20ml.) and dried at 70°C. There was thus obtained 3-(2-acetylamino-2-phenylethyl)thiazolidin-2-thione, m.p. 180°–188°C.

EXAMPLE 9

N-(2-Acetylamino-2-phenylethyl)ethanolamine-O-sulphate (1.51g.) and potassium ethyl xanthate (0.80g.) were dissolved in dimethylformamide (5ml.). Potassium carbonate (0.345g.) was added and the mixture was heated at 80°C. until evolution of carbon dioxide ceased. The mixture was then poured into water (30ml.) and the resulting precipitate filtered off, washed with water (10ml.) and dried at 70°C. to give 3-(2-acetylamino-2-phenylethyl)-thiazolidin-2-thione, m.p. 180°–183°C.

EXAMPLE 10

N-(2-Phenylacetylamino-2-phenylethyl)ethanolamine-O-sulphate (1.89g.) was suspended in n-butanol (20ml.), and triethylamine (1.01ml.) was added. The mixture was refluxed for five minutes to dissolve all solid material. Carbon disulphide (0.5ml.) was then added and the solution was refluxed for a further fifteen minutes. After cooling to room temperature and allowing crystallisation to finish, the product, 3-(2-phenylacetylamino-2-phenylethyl)thiazolidin-2-thione, was filtered off, washed with acetone (30ml.) and dried at 50°C. to give material of having m.p. 182°–184°C.

EXAMPLE 11

N-(2-Acetylamino-2-phenylethyl)ethanolamine-O-sulphate (1.51g.) was dissolved in a warm mixture of t-butanol (10ml.) and triethylamine (1.0lml.). The solution was cooled, carbon disulphide (0.5ml.) was added, and the mixture was kept at room temperature for sixteen hours. The mixture was diluted with water (20ml.), kept for half an hour and then filtered. The solid residue was washed with water (10ml.) and dried at 70°C. to give 3-(2-acetylamino-2-phenylethyl)-thiazolidin-2-thione, m.p. 180°–183°C.

EXAMPLE 12

N-(2-Phenylacetylamino-2-phenylethyl)-2-chloroethylamine hydrochloride (1.77g.) and carbon disulphide (0.5ml.) were dissolved in methanol (10ml.), triethylamine (1.0ml.) was added, and the solution was stirred at 25°C. for two hours. The resulting mixture was filtered, and the solid residue washed with ethanol (2 × 4ml.) and dried at 60°C. to give 3-(2-phenylacetylamino-2-phenylethyl)thiazolidin-2-thione, m.p. 182°–184°C.

The chloride used as starting material was obtained as follows:

N-(2-Phenylacetylamino-2-phenylethyl)ethanolamine-O-sulphate (18.9g.) was suspended in a mixture of ethanol (20ml.) and 2N-hydrochloric acid (100ml.), and the mixture was refluxed for five and a half hours. The resulting solution was cooled to 25°C., basified with 18N-sodium hydroxide to pH 11, and extracted with methylene chloride (2 × 75ml.). The combined extracts were dried over anhydrous sodium sulphate and evaporated to dryness at 40°C/15mm. leaving a sticky solid. This was crystallised from toluene (50ml.) to give N-(2-phenylacetylamino-2-phenylethyl)ethanolamine, m.p. 138°–141°C.

This alcohol (2.98g.) was dissolved in ethylene dichloride (25ml.) at 60°C. and the hot solution was added dropwise to a stirred solution of thionyl chloride (0.87ml.) in ethylene dichloride (10ml.). The resulting solution was allowed to cool to 25°C, stirred for sixteen hours, and isopropanol (1ml.) was then added. The product which crystallised was isolated by filtration, washed with ethylene dichloride (2 × 5ml.) and dried at room temperature, to give N-(2-phenylacetylamino-2-phenylethyl)-2-chloroethylamine hydrochloride, m.p. 173°–176°C.

EXAMPLE 13

A mixture of 3-(2-phenylacetylamino-2-phenylethyl)-thiazolidin-2-thione (7.12g.) and methyl p-toluenesulphonate (5.58g.) was heated at 170°C. for 20 minutes. The reaction mixture was cooled and triturated with acetone (75ml.), and the mixture kept overnight to allow crystallisation to finish. The crystalline product was filtered off, washed with acetone (10ml.) and dried at 70°C. to give tetramisole P-toluenesulphonate. A sample crystallised from ethanol had m.p. 159°–160°C.

EXAMPLE 14

3-(2-Phenylacetylamino-2-phenylethyl)thiazolidin-2-thione (1.0g.) was dissolved in dimethyl formamide (2.0ml.), and 2-methylallyl chloride (10ml.) was added. The solution was then refluxed (b.p. 72°C.) for 48 hours, and then cooled to room temperature. The solid which crystallised was filtered off, washed with acetone (5ml.) and dried at 60°C. to give tetramisole hydrochloride, m.p. 255°–258°C.

EXAMPLE 15

A mixture of 3-(2-phenylacetylamino-2-phenylethyl)thiazolidin-2-thione (1.78g.) and n-octyl methanesulphonate (2.6g.) was heated at 160°C. for 15 minutes. The reaction mixture was cooled and diluted with chloroform (20ml.), and the mixture was extracted with water (20ml.). The aqueous extract was adjusted to pH 11 with 2N-sodium hyroxide and extracted with ethylene dichloride (10ml.). The organic extract was acidified to pH 2 with gaseous hydrogen chloride, and the precipitated tetramisole hydrochloride was filtered off, washed with acetone (5ml.) and dried at 70°C. to give material melting at 258°–260°C.

EXAMPLE 16

A mixture of 3-(2-phenylacetylamino-2-phenylethyl)thiazolidin-2-thione (3.56g.) and diethyl sulphate (3.0ml.) was heated at 140°C. for 20 minutes. The solution was cooled to room temperature, diluted with ethylene dichloride (20ml.), and the mixture extracted with water (20ml.). The aqueous extract was basified to pH 11 with 2N-sodium hydroxide and the precipitated tetramisole was filtered off, washed with water (2ml.) and dried at room temperature. After crystallisation from cyclohexane the product melted at 92°–93°C.

EXAMPLE 17

A mixture of 3-(2-phenylacetylamino-2-phenylethyl)-thiazolidin-2-thione (1.78g.) and n-decyl bromide (3.32g.) was heated at 180°C. for 20 minutes. The mixture was cooled and then triturated with refluxing ethylene dichloride (10ml.) until the product had completely crystallised. The cooled mixture was filtered, the solid residue washed with acetone (3×5ml.) and dried at 60°C., to give tetramisole hydrobromide, m.p. 238°–242°C.

EXAMPLE 18

3-(2-Phenylacetylamino-2-phenylethyl)thiazolidin-2-thione (1.0g.) and allyl iodide (1.38g.) were dissolved in nitrobenzene (5ml.), and the solution was heated at 210°C. for 5 minutes. The solution was cooled to room temperature. A 5μsample of the solution was applied to a thin layer chromatographic plate made up from Merck silica gel GF 254, and the plate was eluted with a solvent composed of ethyl acetate (100 parts by volume), methanol (10 parts by volume) and ammonium hydroxide (specific gravity 0.880; 1 part by volume). The presence of tetramisole in the reaction mixture was confirmed by comparison with an authentic sample, using the $R_F$ value of the compound and the characteristic colour obtained on spraying the developed plate with a mixture of equal parts of a 0.3% w/v aqueous solution of chloroplatinic acid and a 6% w/v solution of potassium iodide.

EXAMPLE 19

N-(2-Valerylamino-2-phenylethyl)ethanolamine-O-sulphate (8.6g.) was suspended in a mixture of water (20ml.) and ethanol (10ml.). Carbon disulphide (2.5ml.) was added, the reaction mixture stirred at room temperature and the pH adjusted to 9–10 by addition of 2N-sodium hydroxide. The reaction mixture was kept at this pH by the further addition of 2N-sodium hydroxide until the reaction was complete after two hours. The product was filtered off, washed with water (30ml.) and dried at 60°C. to give 3-(2-valerylamino-2-phenylethyl)thiazolidin-2-thione, m.p. 175°–176°C.

The sulphate used as starting material was obtained as follows:

Sulphuric acid (98% w/w; 80g.) was added to stirred valeronitrile (24.9g.) below 10°C. N-(2-Hydroxy-2-phenylethyl)ethanolamine (18.1g.) was added in small portions, keeping the temperature below 20°C. After stirring for two hours, the reaction mixture was poured into a mixture of ice (200g.) and ethylene dichloride (250ml.). The precipitated product was filtered off and washed with water (2 × 50ml.) to give crude N-(2-valerylamino-2-phenylethyl)ethanolamine-O-sulphate. This was purified by dissolving it in N-sodium hydroxide (100ml.) and reprecipitating it by the addition of glacial acetic acid to pH 4. After filtering, washing with water (3 × 50ml.), and drying at 60°C., the product had m.p. 198°–200°C.

EXAMPLE 20

3-(2-Valerylamino-2-phenylethyl)thiazolidin-2-thione (1.0g.) was dissolved in refluxing methyl isobutyl ketone (5.0ml.). Benzyl chloride (1.15ml.) was added and the solution was refluxed, (b.p. 117°C.) for 6 hours. The mixture was cooled, acetone (10ml.) was added, and the mixture was heated to reflux again. The solid product was filtered from the hot mixture, washed with acetone (2 × 5ml.) and dried at 60°C., to give tetramisole hydrochloride, m.p. 258°–260°C.

EXAMPLE 21

The method described in Example 20 was repeated, but substituting tetrachloroethylene (10ml.) for methyl isobutyl ketone as solvent, and refluxing (b.p. 121°C.)

for 20 hours before isolating the product. The tetramisole hydrochloride obtained had m.p. 256°–259°C.

EXAMPLE 22

3-(2-Valerylamino-2-phenylethyl)thiazolidin-2-thione (1.0g.) and benzyl chloride (1.15ml.) were dissolved in dimethylformamide (2.5ml.), and the solution was heated at 90°C. for 18 hours, and then cooled to room temperature. The solid product, tetramisole hydrochloride, was filtered off, washed with acetone (2 × 5ml.), and dried at 60°C; it then had m.p. 255°–257°C.

EXAMPLE 23

The method described in Example 22 was repeated but using diethyleneglycol diethyl ether (3.0ml.) as solvent instead of dimethylformamide, and the reaction being carried out under reflux (160°C.) for 1 hour. The tetramisole hydrochloride was isolated as described in Example 22, and had m.p. 255°–258°C.

EXAMPLE 24

3-(2-Valerylamino-2-phenylethyl)thiazolidin-2-thione (1.0g.) and benzyl chloride (1.15ml.) were dissolved in n-butyl acetate (6.0ml.), and the solution was refluxed (b.p. 127°C.) for 18 hours. The hot mixture was then filtered and the solid product, tetramisole hydrochloride, was washed with acetone (2 × 5ml.) and dried at 60°C.; it then had m.p. 256°–258°C.

EXAMPLE 25

3-(2-Phenylacetylamino-2-phenylethyl)thiazolidin-2-thione (6.0g.) was dissolved in methylene dichloride (100ml.) and a solution of triethyloxonium fluoroborate (3.2g.) in dichloromethane (5ml.) was added dropwise, with stirring, at room temperature. The solution was kept at room temperature for one hour and then evaporated to dryness at 20°C./12mm. The yellow gum obtained was dissolved in tetrahydrofuran (75ml.) at room temperature, and allowed to crystallise. The crystals were filtered off, washed successively with tetrahydrofuran (2 × 10ml.) and diethyl ether (50ml.) and dried under vacuum (12mm.) over phosphorus pentoxide at room temperature. A sample of the 2-ethylthio-3-(2-phenylacetylamino-2-phenylethyl)-4,5-dihydrothiazolium fluoroborate thus obtained was crystallised from tetrahydrofuran and then had m.p. 116°–118°C.

2-Ethylthio-3-(2-phenylacetylamino-2-phenylethyl)-4,5-dihydrothiazolium fluoroborate (2.0g.) was heated for 1 hour in an air bath at 190°C. The resulting yellow gum was cooled to room temperature and dissolved in methanol (5ml.), and this solution was diluted with water (20ml.), basified with 18N-sodium hydroxide to pH 12 and extracted with methylene dichloride (2 × 10ml.). The combined organic extracts were then back-extracted with 2N-sulphuric acid (3 × 10ml.), and the aqueous extracts were combined and basified with 18N-sodium hydroxide to pH 12, keeping the temperature below 10°C. The precipitated tetramisole was isolated by filtration, washed with water (10ml.) and dried at room temperature. A sample of this material was crystallised from cyclohexane and had m.p. 92°–93°C.

EXAMPLE 26

3-(2-Amino-2-phenylethyl)thiazolidin-2-thione hydrochloride (0.55g.) was suspended in formic acid (3ml.), sodium formate (0.136g.) was added, and the mixture was heated to give a solution. Benzyl chloride (0.4ml.) was added to this solution and the resulting solution was refluxed for two hours. More benzyl chloride (0.2ml.) was added, and the solution was refluxed for 1 hour. The solution was then cooled to 25°C., diluted with water (10ml.), and washed with methylene dichloride (10ml., and then 3ml.). The aqueous phase was then basified to pH 12 with 18N-sodium hydroxide and extracted with methylene dichloride (10ml., and then 3ml.), the combined organic extracts were dried over anhydrous sodium sulphate and evaporated to dryness at 40°C./15mm. The residue was dissolved in acetone (3.0ml.), and the solution was acidified to pH 2 with concentrated hydrochloric acid. The resulting mixture was filtered, the solid residue was washed with acetone (2 × 3ml.), dried at room temperature, and crystallised from ethanol. There was thus obtained tetramisole hydrochloride, m.p. 258°–260°C.

The amino derivative used as starting material was obtained as follows:

3-(2-Phenylacetylamino-2-phenylethyl)thiazolidin-2-thione (5.25g.) was dissolved in refluxing ethanol (100ml.), and the solution was added to 5N-hydrochloric acid (100ml.). The resulting dispersion was refluxed for 66 hours, and then cooled to room temperature. The resulting mixture was filtered, and the solid residue was washed with acetone (2 × 10ml.) and dried at 60°C. to give 3-(2-amino-2-phenylethyl)-thiazolidin-2-thione hydrochloride, m.p. 220°–222°C.

EXAMPLE 27

3-(2-Formylamino-2-phenylethyl)thiazolidin-2-thione (0.268g.) and benzyl chloride (0.20ml.) were intimately mixed and heated at 200°C. for 3 minutes, then cooled to room temperature, and triturated with ethylene dichloride (2.0ml.). The resulting mixture was filtered, and the solid residue washed with acetone (5ml.) and dried at room temperature to give tetramisole hydrochloride, m.p. 258°–260°C. after recrystallisation from ethanol.

The formamide used as starting material was obtained as follows:

3-(2-Amino-2-phenylethyl)thiazolidin-2-thione hydrochloride (1.38g.) was dissolved in formic acid (12.5ml.) by adding sodium formate (0.34g.) and warming the mixture to 40°C. Acetic anhydride (4.15ml.) was added, the solution was stirred for five minutes and then cooled to room temperature and stirred for 2 hours. The solution was diluted with water (30ml.), the resulting mixture was filtered, and the solid residue was washed with water (2 × 20ml.) and dried at 60°C. After crystallisation from a mixture of toluene and ethanol in the ratio 7:3 v/v, the product, 3-(2-formylamino-2-phenylethyl)thiazolidin-2-thione, had m.p. 186°–188°C.

EXAMPLE 28

2-Ethylthio-3-(2-phenylacetylamino-2phenylethyl)-4,5-dihydrothiazolium fluoroborate (198.5mg.) was dissolved in a mixture of acetone (2ml.) and water (10ml.). The pH of the solution was ajusted to 9.5 and maintained at this value using 0.1M-sodium hydroxide. After 15 minutes the pH of the solution was adjusted to 5.0 with 0.1M-hydrochloric acid, and the solution was washed with chloroform (4 × 60ml.). The pH of the aqueous solution was then adjusted to 10.5 with 0.1M-sodium hydroxide, and the solution was extracted with chloroform (3 × 60ml.). The combined chloroform extracts were filtered through Whatman 1 ₛ" phase separation paper, evaporated to dryness at 50°C./12mm., and the residual colourless gum dissolved in chloroform (1ml.). This solution was acidified with a solution of hydrogen chloride in diethyl ether, kept at room temperature overnight and the precipitated tetramisole hydrochloride was filtered off and dried at 40°C. The infra red spectrum of the isolated solid was identical with that of an authentic sample of tetramisole hydrochloride.

The starting material was obtained as described in Example 25.

What we claim is:

1. A process for the manufacture of tetramisole and pharmaceutically-acceptable salts thereof, which comprises reacting a compound of the formula:

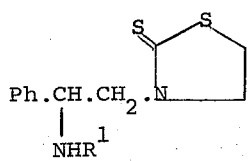   I wherein Ph stands for phenyl, and R¹ stands for hydrogen or —COR², wherein R² stands for hydrogen, alkyl of not more than 5 carbon atoms, phenyl, or phenylalkyl of not more than 10 carbon atoms, with triethyloxonium fluoroborate or R³X, wherein R³ stands for alkyl of not more than 12 carbon atoms, alkenyl of not more than 5 carbon atoms but excluding vinyl, or phenylalkyl of not more than 10 carbon atoms, and X stands for halogen, —O.SO₂.R⁴ or —O.SO₂.OR⁵, wherein R⁴ stands for alkyl of not more than 5 carbon atoms, phenyl, or tolyl, and R⁵ stands for alkyl of not more than 5 carbon atoms, and when R³X has the formula R³O.-SO₂.OR⁵ then R³ and R⁵ stand for the same alkyl of not more than 5 carbon atoms, the process being carried out under non-aqueous conditions up to the stage where there is formed an intermediate compound of the formula:

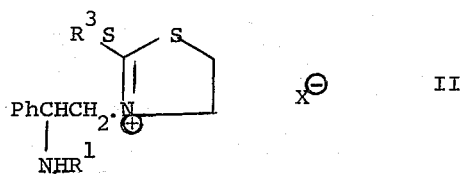   II wherein Ph, R¹ and R³ have the meanings stated above and X⁻ stands for an ion corresponding to X, the latter having the meaning stated above, or an equivalent intermediate compound in which X⁻ stands for a fluoroborate ion.

2. The process as claimed in claim 1 wherein Ph stands for phenyl, R¹ stands for —COR², wherein R² stands for hydrogen, alkyl of not more than 5 carbon atoms, or phenylalkyl of not more than 10 carbon atoms, R³ stands for alkyl of not more than 5 carbon atoms, alkenyl of not more than 5 carbon atoms but excluding vinyl, or phenylalkyl of not more than 10 carbon atoms, and X has the meaning stated in claim 1.

3. A compound of the formula:

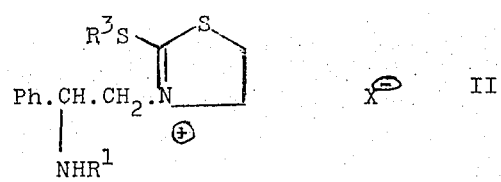   II wherein Ph, R¹ and R³ have the meanings stated in claim 1, and X⁻ stands for a fluoroborate ion or for an ion derived from X, wherein X has the meaning stated in claim 1.

4. A process for the manufacture of tetramisole and pharmaceutically-acceptable salts thereof, which comprises heating a compound of the formula II at 50° to 200°C. or adjusting an aqueous or non-aqueous solution of the said compound to pH 4 to 14, and wherein Ph, R¹ and R³ have the meanings stated in claim 1 and X⁻ has the meaning stated in claim 3.

5. A compound of the formula:

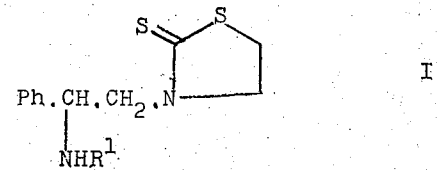   I wherein Ph and R¹ have the meanings stated in claim 1.

6. A process for the manufacture of a compound as claimed in claim 5 in which Ph has the meaning stated in claim 1 and R¹ stands for —COR², wherein R² has the meaning stated in claim 1, which comprises reacting a compound of the formula:

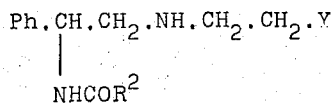

wherein Ph and R² have the meanings stated above and Y stands for hydrogen-sulphato, chlorine or bromine, with carbon disulphide at a pH greater than 4.

* * * * *